US010865651B2

(12) United States Patent
Schlemmer et al.

(10) Patent No.: US 10,865,651 B2
(45) Date of Patent: Dec. 15, 2020

(54) SEALING ASSEMBLY FOR A FLUID KINETIC MACHINE, METHOD FOR PRODUCING A SEALING ASSEMBLY AS WELL AS FLUID KINETIC MACHINE

(71) Applicants:MTU Aero Engines AG, Munich (DE); ALMECON TECHNOLOGIE GMBH, Arnsberg (DE)

(72) Inventors: Markus Schlemmer, Mainburg/Sandelzhausen (DE); Klaus Pirker, Klagenfurt (AT); Ralph Kropp, Wartenberg (DE); Lorenz Vinke, Arnsberg (DE); Waldemar Wiebe, Arnsberg (DE)

(73) Assignees: MTU Aero Engines AG, Munich (DE); Almecon Technologie GmbH, Arnsberg (DE)

( * ) Notice: Subject to any disclaimer, the term of this patent is extended or adjusted under 35 U.S.C. 154(b) by 60 days.

(21) Appl. No.: 16/183,357

(22) Filed: Nov. 7, 2018

(65) Prior Publication Data
US 2019/0136705 A1    May 9, 2019

(30) Foreign Application Priority Data

Nov. 9, 2017 (EP) .................................. 17200845

(51) Int. Cl.
*F01D 11/00* (2006.01)
*F16J 15/44* (2006.01)

(52) U.S. Cl.
CPC .......... *F01D 11/001* (2013.01); *F01D 11/003* (2013.01); *F16J 15/444* (2013.01);
(Continued)

(58) Field of Classification Search
CPC ...... F01D 11/001; F01D 11/12; F01D 11/122; F01D 11/127; F01D 9/011; F01D 9/041
See application file for complete search history.

(56) References Cited

U.S. PATENT DOCUMENTS 2,963,307 A * 12/1960 Bobo ..................... F16J 15/444
                                                            277/414
4,521,159 A *  6/1985 Pask ..................... F01D 25/246
                                                            277/412
(Continued)

FOREIGN PATENT DOCUMENTS

DE        459090 C     4/1928
DE      3911571 A1    10/1990
(Continued)

OTHER PUBLICATIONS

Mowitz, D. Key Rules on Welding Angle, Direction, and Speed. Successful Farming, Jul. 13, 2015. Accessed from https://www.agriculture.com/machinery/tools/welding/key-rules-on-welding-gle-direction_245-ar49501 (Year: 2015).*

*Primary Examiner* — Michael Lebentritt
*Assistant Examiner* — Topaz L. Elliott
(74) *Attorney, Agent, or Firm* — Barlow, Josephs & Holmes, Ltd.

(57) ABSTRACT

The invention relates to a sealing assembly for a fluid kinetic machine, in particular for an aircraft engine, for sealing a radial gap between a rotor and a stator, including at least one sealing support for retaining and/or fixing at least one sealing element, wherein the sealing support includes a first and a second radial web extending in a radial extension direction as well as an axial web extending in an axial extension direction, firmly bonded to the radial webs, and the radial webs form a receptacle for receiving an element of the stator. Therein, the radial webs are formed as sheet elements formed elongated in radial direction, wherein a radially interior end of the radial webs is respectively firmly bonded, in particular welded, to a radially exterior surface of the axial web.

15 Claims, 3 Drawing Sheets

(52) U.S. Cl.
CPC .... *F05D 2230/234* (2013.01); *F05D 2230/54* (2013.01); *F05D 2240/55* (2013.01); *F05D 2240/56* (2013.01); *F05D 2250/283* (2013.01); *F05D 2250/75* (2013.01)

(56) References Cited

U.S. PATENT DOCUMENTS

| | | | | |
|---|---|---|---|---|
| 7,128,535 B2* | 10/2006 | Sucin | ............... | F01D 5/063 416/198 A |
| 8,186,938 B2* | 5/2012 | Young | ............... | F01D 5/085 415/115 |
| 8,662,835 B2* | 3/2014 | Fachat | ............... | F01D 11/001 415/173.5 |
| 8,864,451 B2* | 10/2014 | Piggott | ............... | F16J 15/4472 415/173.7 |
| 9,080,449 B2* | 7/2015 | Bridges | ............... | F01D 5/082 |
| 9,291,071 B2* | 3/2016 | Jewess | ............... | F01D 25/12 |
| 9,382,809 B2* | 7/2016 | Bayer | ............... | F01D 25/00 |
| 9,631,557 B2* | 4/2017 | Luneau | ............... | F01D 11/001 |
| 9,856,736 B2* | 1/2018 | Stiehler | ............... | F01D 11/02 |
| 10,077,663 B2* | 9/2018 | Malmborg | ............... | F01D 5/066 |
| 2007/0286719 A1 | 12/2007 | Duesler | | |
| 2011/0236185 A1* | 9/2011 | Piggott | ............... | F01D 11/001 415/170.1 |
| 2013/0025290 A1* | 1/2013 | Glahn | ............... | F01D 11/008 60/772 |
| 2013/0081406 A1* | 4/2013 | Malmborg | ............... | F01D 5/066 60/805 |
| 2013/0189086 A1* | 7/2013 | Bayer | ............... | F01D 11/127 415/173.1 |
| 2014/0044537 A1* | 2/2014 | Hackenberg | ............... | F01D 11/001 415/209.3 |
| 2014/0105725 A1* | 4/2014 | Stiehler | ............... | F01D 11/02 415/115 |
| 2014/0154059 A1* | 6/2014 | Jewess | ............... | F01D 25/12 415/170.1 |
| 2015/0275674 A1* | 10/2015 | Alvarez Garcia | ...... | F01D 5/081 416/95 |
| 2015/0377049 A1* | 12/2015 | Weber | ............... | F01D 11/00 415/173.7 |
| 2017/0009593 A1* | 1/2017 | Watanabe | ............... | F01D 9/041 |
| 2018/0135449 A1* | 5/2018 | Klingels | ............... | F02C 7/28 |
| 2018/0306198 A1* | 10/2018 | Motsch | ............... | F04D 29/164 |
| 2018/0340435 A1* | 11/2018 | Schlemmer | ............... | F01D 25/246 |
| 2018/0347384 A1* | 12/2018 | Kislinger | ............... | F01D 11/001 |
| 2020/0025018 A1* | 1/2020 | Schlemmer | ............... | F01D 9/041 |

FOREIGN PATENT DOCUMENTS

| | | | | |
|---|---|---|---|---|
| EP | 2551454 A2 | | 1/2013 | |
| EP | 2696039 A1 | | 2/2014 | |
| EP | 2722486 A1 | | 4/2014 | |
| FR | 2988428 A1 | * | 9/2013 | ........... F01D 11/001 |
| GB | 2121885 A | | 1/1984 | |
| WO | 2005003519 A1 | | 1/2005 | |

* cited by examiner

SEALING ASSEMBLY FOR A FLUID KINETIC MACHINE, METHOD FOR PRODUCING A SEALING ASSEMBLY AS WELL AS FLUID KINETIC MACHINE

BACKGROUND OF THE INVENTION

The invention relates to a sealing assembly for a fluid kinetic machine, in particular for an aircraft engine. Further aspects of the invention relate to a method for producing a sealing support of a sealing assembly for a fluid kinetic machine as well as to a fluid kinetic machine.

In the production of fluid kinetic machines, it is known to compose guide blade rings of a plurality of guide blade segments. Such guide blade rings serve for orienting a medium (working medium) flowing in the operation of fluid kinetic machines through them. At least a part of the kinetic energy of the flowing medium can be converted to swirl energy by means of the guide blade rings in the orientation. This swirl energy can be used to move (drive) an impeller adjoining to the guide blade ring and thereby to set a drive shaft of the fluid kinetic machine connected to the impeller into a rotational movement. In order to be able to operate fluid kinetic machines with a relatively great efficiency, it is reasonable to keep possible gaps—for example between the guide blade ring and a shaft housing part adjoining thereto in a radial extension direction such as for example a rotor housing of the fluid kinetic machine—as small as possible. Thereby, unintended fluid leakage of the medium can be at least largely prevented.

From EP 2 551 454 A2, generic sealing assemblies for fluid kinetic machines are known. The sealing assemblies are very massively formed on the one hand since two radial webs are here integrally formed at a sealing support for forming a receptacle for the stator element. Besides a relatively high weight, these known sealing assemblies are more difficult to manufacture since material has to be removed in the clearance between the radial webs. Furthermore, EP 2 551 454 A2 shows a sealing assembly, in which two L-shaped webs are connected to an axial web spaced from each other and form the sealing support. The clearance between the respective radially arranged areas of the webs forms the receptacle for the stator element. The axially oriented areas of the webs are connected to the axial web. However, the high material consumption, the relatively high weight of the sealing assemblies caused thereby as well as the high manufacturing effort and the high cost for the production of the sealing assemblies resulting therefrom are disadvantageous in the known sealing assemblies.

It is the object of the present invention to provide a sealing assembly for a fluid kinetic machine, a method for producing a sealing assembly for a fluid kinetic machine as well as a fluid kinetic machine of the initially mentioned type, which can be simply and inexpensively produced and additionally have a weight lower compared to known sealing assemblies.

BRIEF SUMMARY OF THE INVENTION

These objects are solved by a sealing assembly, a method as well as by a fluid kinetic machine of the present invention. Advantageous configurations with convenient developments of the invention are specified in detail below, wherein advantageous configurations of each inventive aspect are to be regarded as advantageous configurations of the respectively other inventive aspects and vice versa.

A first aspect of the invention relates to a sealing assembly for a fluid kinetic machine, in particular for an aircraft engine, for sealing a radial gap between a rotor and a stator, including at least one sealing support for retaining and/or fixing at least one sealing element, wherein the sealing support includes a first and a second radial web extending in a radial extension direction R as well as an axial web extending in an axial extension direction A firmly bonded to the radial webs and the radial webs form a receptacle for receiving an element of the stator. Therein, the radial webs are formed as sheet elements formed elongated in radial direction, wherein a radially interior, non-bent end of the radial webs is respectively firmly bonded to a radially exterior surface of the axial web edge to edge. The radially interior, non-bent end of the radial web is in abutting arrangement with said radially exterior surface of the axial web. Said radially interior, non-bent end of the radial web forms an abutting surface to be firmly bond to the radially exterior surface of the axial web. The sealing assembly according to the invention can be inexpensively produced since the sealing support can be produced by exclusively firmly bonding methods such as for example welding methods. In contrast to known production methods, extensive tacking for fixing the components such as for example in soldering is for example not required. By the configuration of the radial webs as flat sheet elements formed elongated in radial direction, a material saving additionally arises such that the produced sealing assembly can overall be relatively lightweight formed. According to the invention, the L angles or L-shaped axial webs usually used in the prior art can for example be avoided. In addition, there is the possibility that the axial web is also formed as a sheet element. By firmly bonding, in particular welding, two sheet parts, namely the respective radial web to the axial web, a minimum material input is realized in an inexpensive bonding or welding operation. The radial and axial webs form a material bonded connection. Therein, the sheet elements are firmly bonded or welded to each other corresponding to the geometric requirements such that a soldering process or a lathing operation can be omitted. The sealing assembly according to the invention can therefore be relatively lightweight and inexpensively produced. Therein, welding can be effected by means of a laser welding method.

The radial webs are respectively firmly bonded, in particular welded, to the radially exterior surface of the axial web edge to edge. This means that the bonded or welded ends of the radial webs are not bent to be connected to the axial web in extensive manner or "surface to surface". Surprisingly, it has turned out that such a firmly bonded connection or weld edge to edge, which ensures a comparatively simple construction and an uncomplicated manufacture, satisfies the high stability requirements to the component.

In a further advantageous configuration of the sealing assembly according to the invention, an axially extending outer flange is formed at a radially outer end of at least one of the radial webs. Therein, the outer flange for example cooperates with a correspondingly formed component of an adjacent guide blade series to prevent direct radial outflow of the flow medium, in particular the hot gas, from the flow channel into the radially inner housing structure.

In a further advantageous configuration of the sealing assembly according to the invention, the sealing support is T-shaped formed such that the axial web extends beyond a connection area between the radial web and the axial web on both sides in axial direction. By this configuration of the sealing support, a relatively large, radially interior abutment surface of the axial web for retaining and/or fixing the at least one sealing element is advantageously provided. The sealing element is usually formed as a honeycomb seal. However, there is also the possibility that brush-like sealing elements are attached to the axial web of the sealing support.

In a further advantageous configuration of the sealing assembly according to the invention, the sealing assembly includes a front ring or a front ring segment and/or a rear ring or a rear ring segment viewed in flow direction S, wherein the front ring or the front ring segment is connected to the first radial web and the rear or the rear ring segment is connected to the second radial web in force-fit and/or firmly bonded manner. Therein, the front and/or rear ring or the front and/or rear ring segments cooperate for example with corresponding components of an adjacent guide blade series to again prevent direct radial outflow of the flow medium, in particular the hot gas, from the flow channel into the radially inner housing structure of the fluid kinetic machine.

Therein, the front ring or the front ring segment and/or the rear ring and/or the rear ring segment can be formed as sheet elements. Thereby, the front ring or the front ring segment and/or the rear ring or the rear ring segment can be very simply produced in particular as a lightweight component. Overall, there again arises a considerable weight reduction of the sealing assembly according to the invention with respect to the sealing assemblies known in the prior art. Therein, the production of the rings or ring segments can be effected by means of rolling. Usually, the rings or ring segments are integrally formed. However, there is also the possibility to manufacture the individual elements of the front or rear ring or ring segment from individual parts and to for example solder or weld them to each other. Furthermore, there is the possibility to produce the mentioned rings or ring segments for example from a nickel base material, in particular by means of a cutting method or else an additive manufacturing method.

In further advantageous configurations of the sealing assembly according to the invention, the element of the stator is a blade foot or a blade foot segment of a guide blade ring, a guide blade ring segment or a guide blade of the fluid kinetic machine. In this case, the sealing assembly can be formed as a so-called SIAS (static inner air seal) ring or SIAS ring segment.

In addition, at least one slide stone can be arranged between the radial webs and connected to them by means of at least each one axial bolt. Therein, the slide stone can be composed of metal, a metal alloy, ceramic or other suitable materials, in particular high-temperature resistant materials.

A second aspect of the invention relates to a method for producing a sealing assembly for a fluid kinetic machine according to the first inventive aspect including at least the following method steps: producing a first and a second radial web such that they are formed as elongated formed sheet elements, producing an axial web and firmly bonding, respectively a radially interior, non-bent end of the radial webs to a radially exterior surface of the axial web edge to edge. Therein, the axial web can also be formed as a sheet element. Since the connection of the radial webs to the axial web is effected by pure firmly bonding methods, in particular welding operations, the production method can overall be inexpensively performed. In addition, by firmly bonding, in particular welding, the radial webs respectively formed as flat sheet elements to the axial web, a minimal material input additionally results. Therein, the sheet elements are welded to each other corresponding to the geometric requirements. Overall, a component relatively lightweight compared to known sealing assemblies results, which additionally satisfies the requested quality requirements.

In further advantageous configurations of the method according to the invention, welding is effected by means of laser and/or welding is performed in a direction, which is inclined to the radial and axial direction of the fluid kinetic machine and the sealing support, respectively, at an angle between 30° and 60°, preferably 45°, and/or the radial webs are firmly bonded, in particular welded, to the radially exterior surface of the axial web edge to edge. Adhering and soldering methods or a combination of these methods or with welding methods are also conceivable for performing firmly bonding.

Further features and the advantages thereof can be taken from the descriptions of the first inventive aspect, wherein advantageous configurations of the first inventive aspect are to be regarded as advantageous configurations of the second inventive aspect and vice versa.

A third aspect of the invention relates to a fluid kinetic machine, in particular an aircraft engine, with at least one sealing assembly according to the first inventive aspect and/or with at least one sealing support of a sealing assembly produced by means of a method according to the second inventive aspects. The features and the advantages thereof of the third inventive aspect can be taken from the descriptions of the first and second inventive aspects, wherein advantageous configurations of the first and second inventive aspects are to be regarded as advantageous configurations of the third inventive aspect and vice versa. In particular, the efficiency of the fluid kinetic machine according to the invention can be considerably increased.

BRIEF DESCRIPTION OF THE DRAWINGS

Further features of the invention are apparent from the claims, the embodiments as well as based on the drawings. The features and feature combinations mentioned above in the description as well as the features and feature combinations mentioned below in the embodiments are usable not only in the respectively specified combination, but also in other combinations without departing from the scope of the invention. There shows:

DETAILED DESCRIPTION OF THE PREFERRED EMBODIMENTS

Figure 1:
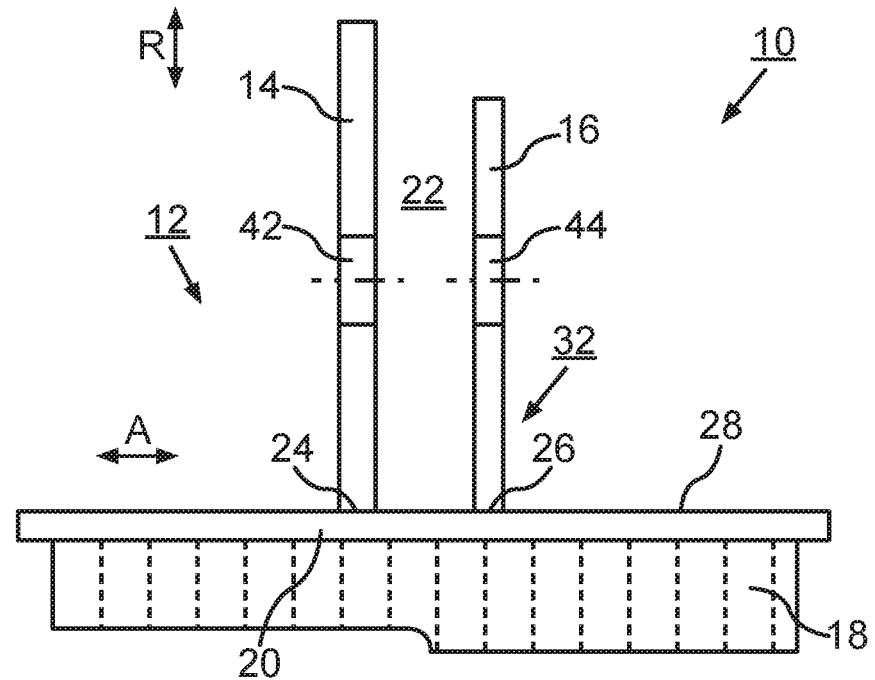
FIG. 1 is a schematic sectional representation of the sealing assembly according to the invention according to a first embodiment.

FIG. 1 shows a schematic sectional representation of a sealing assembly 10 for a fluid kinetic machine, in particular for an aircraft engine, according to a first embodiment. Therein, the sealing assembly 10 serves for sealing a radial gap between a rotor and a stator of the fluid kinetic machine. In the illustrated embodiments, the stator is respectively a guide blade ring of a gas turbine.

The sealing assembly 10 comprises a sealing support 12 for retaining and/or fixing a sealing element 18, wherein the sealing support 12 includes a first and a second radial web 14, 16 extending in a radial extension direction R as well as an axial web 20 extending in an axial extension direction A firmly bonded to the radial webs 14, 16 and the radial webs 14, 16 form a receptacle 22 for receiving an element of the stator. The indications "radial" and "axial" can also include directions, which deviate from an ideal axial or radial extension direction. Deviations from the ideal axial or radial extension direction in an angular range between +15° and −15° are conceivable. In the illustrated embodiment, the receptacle 22 serves for receiving, retaining and fixing a blade foot or blade foot segment of a guide blade ring segment. Basically, the stator element to be received can be a housing section of the fluid kinetic machine, a section of a guide blade, a section of a blade support and the like. For example, the sealing assembly 10 can be arranged in the area of a low-pressure turbine of an aircraft engine. Furthermore, one recognizes that the sealing element 18 is arranged on a radially interior abutment surface or surface of the axial web 20. A firmly bonded and/or form-fit, detachable or non-detachable connection is understood by "arranging" the sealing element 18 at the axial web 16. In the illustrated embodiment, the sealing element 18 is a honeycomb seal. The honeycomb seal 18 can be composed of usual materials, in particular of metal, a metal alloy, ceramic or also combinations of these materials.

Furthermore, one recognizes that the radial webs 14, 16 are formed as flat sheet elements formed elongated in radial direction, which each comprise a radially interior end 24, 26 and are welded to a radially exterior surface 28 of the axial web 20 with these ends 24, 26. Therein, the axial web 20 is also formed as a sheet element.

Furthermore, it becomes clear from FIG. 1 that the sealing support 12 is T-shaped formed, such that the axial web 20 extends beyond a connection area 32 between the radial webs 14, 16 and the axial web 20 on both sides in axial direction A. Thereby, an abutment surface large in area for arrangement of the sealing element 18 is provided.

Figure 3:
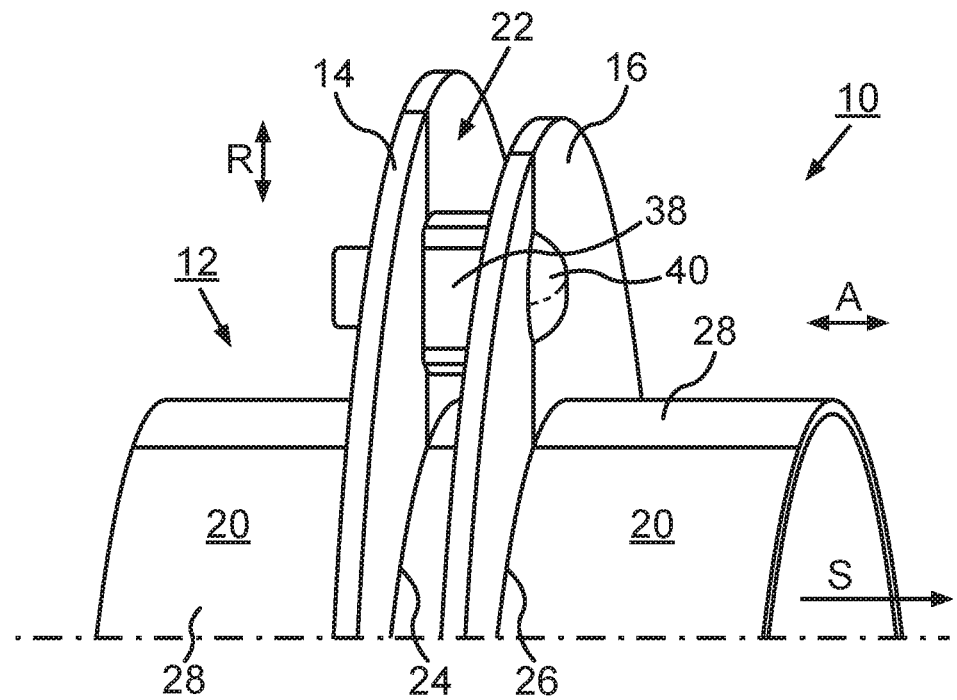
FIG. 3 is a further schematic perspective representation of the sealing assembly according to the invention according to FIG. 1.

In addition, the radial webs 14, 16 comprise openings 42, 44 aligned with each other for receiving an axial bolt 40 (see FIG. 3).

Figure 2:
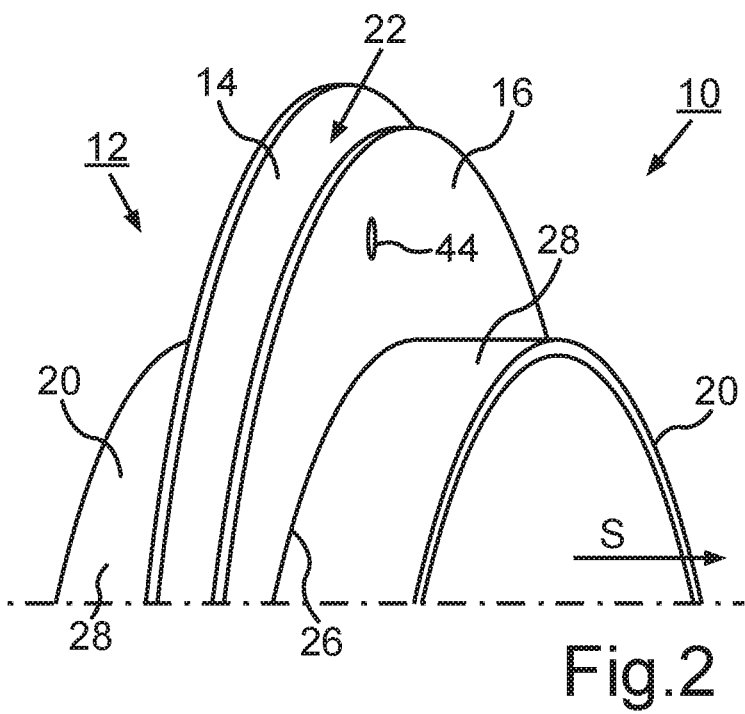
FIG. 2 is a schematic perspective representation of the sealing assembly according to the invention according to FIG. 1.

FIG. 2 shows a schematic perspective representation of the sealing assembly 10 according to FIG. 1. One recognizes the annular configuration of the sealing support 12. One again recognizes that the radial webs 14, 16 form the receptacle 22 for receiving the element of the stator. The radially interior ends 24, 26 of the radial webs 14, 16 are welded to the radially exterior surface 28 of the axial web 20. By the firmly bonded interconnection of the radial webs 14, 16 to the axial web 20, the receptacle 22 is sealingly closed. The flow direction of the fluid kinetic machine is indicated by "S".

FIG. 3 shows a further schematic perspective representation of the sealing assembly 10 according to FIG. 1. One recognizes the arrangement of a slide stone 38 between the radial webs 14, 16. Therein, the slide stone 38 is connected to them by means of the axial bolt 40. With respect to the further elements illustrated in FIG. 3, we make reference to the description of these elements in FIGS. 1 and 2, wherein identical elements have identical reference characters.

Figure 4:
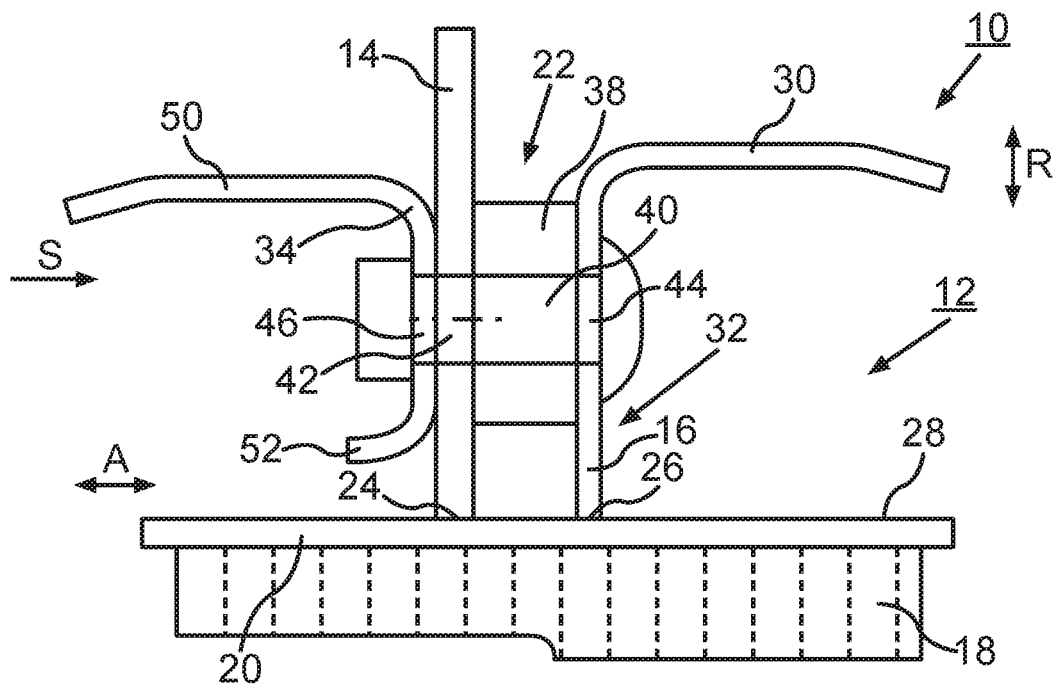
FIG. 4 is a schematic sectional representation of the sealing assembly according to the invention according to a second embodiment.

FIG. 4 shows a schematic sectional representation of a sealing assembly 10 according to a second embodiment. One recognizes that the present embodiment of the sealing assembly 10 comprises a radially extending second radial web 16, at which an axially extending outer flange 30 is formed at a radially outer end, in contrast to the embodiment illustrated in FIGS. 1 to 3. Furthermore, a front ring or front ring segment 34 is arranged at the first radial web 14 fixed by means of the axial bolt 40. Therein, the front ring or the front ring segment 34 is arranged in front of the first radial web 14 viewed in flow direction S. One recognizes that the front ring or the front ring segment 34 comprises a radially extending web, with which the front ring or the front ring segment 34 abuts on the first radial web 14 and respectively comprises a radially interior, axially extending inner flange 52 and a radially exterior, axially extending outer flange 50. Therein, the outer flange 50 and the inner flange 52 are formed integrally with the radially extending web of the front ring or front ring segment 34. For passing the axial bolt 40, an opening 46 aligned with the openings 42, 44 of the first and second radial webs 14, 16 is formed in the radially extending section of the front ring or front ring segment 34.

Furthermore, one recognizes that the radial webs 14, 16 are again formed as sheet elements formed elongated in radial direction, wherein the radially interior ends 24, 26 of the radial webs 14, 16 are respectively welded to the radially exterior surface 28 of the axial web 20. The axial web 20 again serves for arranging the sealing element 18. The two radial webs 14, 16 form a T-shaped sealing support 12 with the axial web 20.

Figure 5:
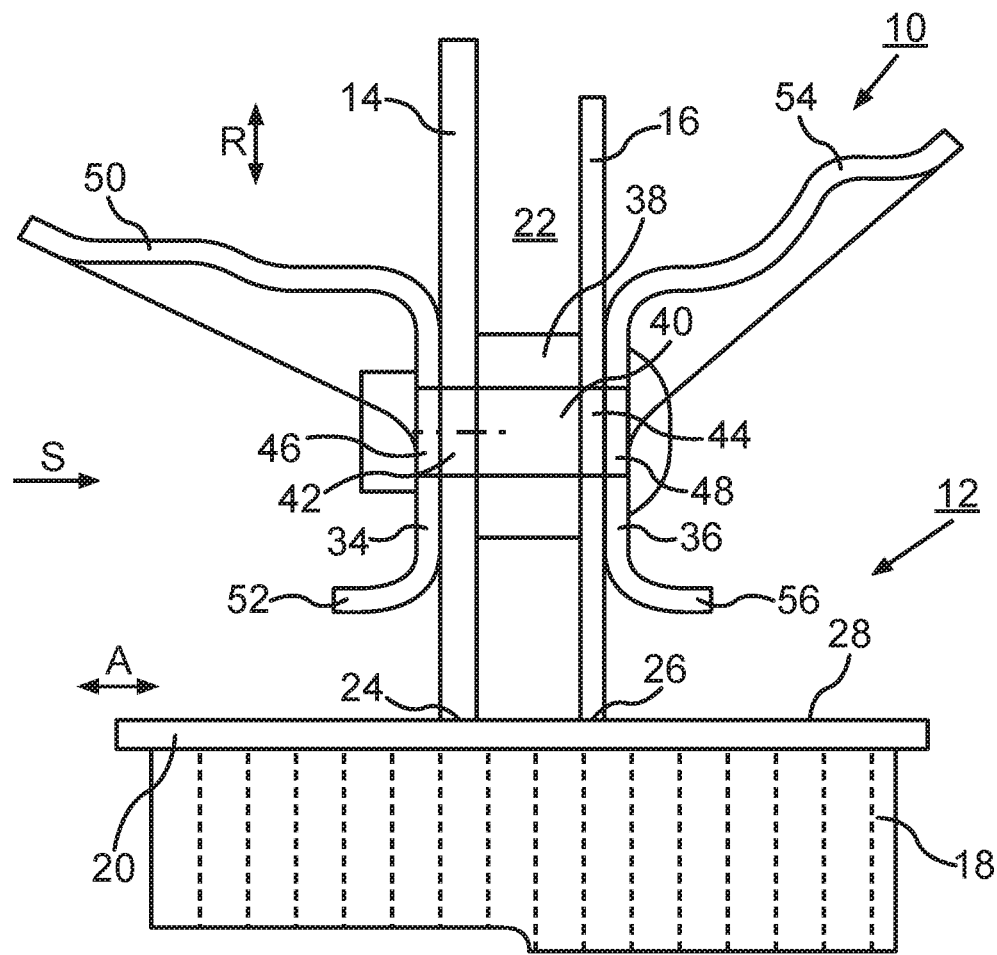
FIG. 5 is a schematic sectional representation of the sealing assembly according to the invention according to a third embodiment.

FIG. 5 shows a schematic sectional representation of a sealing assembly 10 according to a third embodiment. In contrast to the embodiment of the sealing assembly illustrated in FIGS. 1 to 3, the sealing assembly illustrated in FIG. 5 respectively comprises a front ring or a front ring segment 34 and a rear ring or a rear ring segment 36 viewed in flow direction S. Therein, the front ring or the front ring segment 34 is connected to the first radial web 14 and the rear ring or the rear ring segment 36 is connected to the second radial web 16 in force-fit manner via the axial bolt 40. In order to ensure this, a radially oriented section of the rear ring or the rear ring segment 36 comprises an opening 48 aligned with the openings 42, 44 of the first and second radial webs 14, 16. The same applies to the front ring or the front ring segment 34 with the opening 46 already described in FIG. 4. The rear ring or the rear ring segment 36 again comprises an outer flange 54 as well as an inner flange 56, wherein both the outer flange 54 and the inner flange 56 extend in approximately axial direction. The outer flange 54 as well as the inner flange 56 are integrally connected via the radially extending partial area of the rear ring or the rear ring segment 36.

Furthermore, one recognizes that a slide stone 38 is again arranged between the first and the second radial web 14, 16 via the axial bolt 40. The radial webs 14, 16 are welded to the radially interior surface 28 of the axial web 20 via the ends 24, 26 and form the receptacle 22 for receiving an element of the stator. The sealing element 18 is again arranged on the radially interior surface of the axial web 20. In the illustrated embodiment, the sealing element 18 is a honeycomb seal. With respect to the further features of the elements illustrated in FIG. 5, we make reference to the descriptions of the FIGS. 1 to 4, wherein identical elements have identical reference characters. Furthermore, it becomes clear that the front rings or front ring segments presented in the preceding embodiments as well as the rear rings or rear ring segments are formed C-shaped in cross-section. Therein, the respective outer flanges serve for stabilizing the rings 34, 36 as well as for at least partially sealing this area of the housing structure of the fluid kinetic machine with respect to the working medium of the fluid kinetic machine.

It would be appreciated by those skilled in the art that various changes and modifications can be made to the illustrated embodiments without departing from the spirit of the present invention. All such modifications and changes are intended to be covered by the appended claims.

We claim:

1. A sealing assembly for an aircraft engine, for sealing a radial gap between a rotor and a stator, including at least one sealing support for retaining and/or fixing at least one sealing element, wherein each sealing support includes a first and a second radial web extending in a radial extension direction as well as an axial web extending in an axial extension direction, firmly bonded to the radial webs, and the radial webs form a receptacle for receiving an element of the stator, wherein the radial webs are formed as flat sheet elements formed elongated in the radial direction, wherein a radially interior, non-bent end of the radial webs is respectively firmly bonded to a radially exterior surface of the axial web edge to edge.

2. The sealing assembly according to claim 1, wherein the radial webs are welded to the radially exterior surface of the axial web.

3. The sealing assembly according to claim 2, wherein the welding is effected by a laser.

4. The sealing assembly according to claim 2, wherein the welding is performed in a direction, which is inclined to the radial and axial direction of a fluid kinetic machine and the sealing support, respectively, at an angle between 30° and 60°, preferably 115°.

5. The sealing assembly according to claim 1, wherein the axial web is formed as a sheet element.

6. The sealing assembly according to claim 1, wherein the sealing support is T-shaped such that the axial web extends beyond a connection area between the radial webs and the axial web on both sides in the axial direction.

7. The sealing assembly according to claim 1, wherein an axially extending outer flange is formed at a radially outer end of at least one of the radially extending radial webs.

8. The sealing assembly according to claim 1, wherein the sealing assembly includes a front ring or a front ring segment and/or a rear ring and/or a rear ring segment viewed in a flow direction, wherein the front ring or the front ring segment is connected to the first radial web and/or the rear ring or the rear ring segment is connected to the second radial web in a force-fit and/or firmly bonded manner.

9. The sealing assembly according to claim 8, wherein the front ring or the front ring segment and/or the rear ring or the rear ring segment are formed as sheet elements.

10. The sealing assembly according to claim 1, wherein the element of the stator is a blade foot or a blade foot segment of a guide blade ring, a guide blade ring segment or a guide blade of a fluid kinetic machine.

11. The sealing assembly according to claim 1, wherein at least one slide stone is arranged between the radial webs and connected to them by at least one axial bolt.

12. The sealing assembly according to claim 1, wherein the sealing element is formed as a honeycomb or brush seal.

13. The sealing assembly according to claim 1, wherein the sealing assembly is a static inner air seal ring or a ring segment thereof.

14. The sealing assembly according to claim 1, wherein the axial web is formed as a sheet element.

15. The sealing assembly according to claim 1, wherein at least one sealing assembly is configured and arranged in a fluid kinetic machine.

* * * * *